(12) United States Patent
Mosterman et al.

(10) Patent No.: US 7,979,243 B1
(45) Date of Patent: Jul. 12, 2011

(54) SYSTEM AND METHOD FOR GRAPHICAL MODEL PROCESSING

(75) Inventors: Pieter J. Mosterman, Framingham, MA (US); Robert O. Aberg, South Grafton, MA (US)

(73) Assignee: The MathWorks, Inc., Natick, MA (US)

( * ) Notice: Subject to any disclaimer, the term of this patent is extended or adjusted under 35 U.S.C. 154(b) by 1195 days.

(21) Appl. No.: 11/129,000

(22) Filed: May 13, 2005

(51) Int. Cl.
G06F 17/50 (2006.01)
G06F 7/60 (2006.01)
G06G 7/48 (2006.01)
G06F 9/44 (2006.01)

(52) U.S. Cl. .............. 703/2; 703/1; 703/3; 703/6; 703/7; 703/16; 703/17; 703/20

(58) Field of Classification Search .................. 703/1, 2, 703/3, 6, 7, 16, 17, 20, 22
See application file for complete search history.

(56) References Cited

U.S. PATENT DOCUMENTS

| | | | | |
|---|---|---|---|---|
| 4,604,718 A * | 8/1986 | Norman et al. | ..................... | 703/6 |
| 5,157,778 A * | 10/1992 | Bischoff et al. | ................. | 703/14 |
| 5,247,650 A * | 9/1993 | Judd et al. | ......................... | 703/20 |
| 5,701,439 A * | 12/1997 | James et al. | ..................... | 703/17 |
| 5,926,403 A * | 7/1999 | Ho et al. | ............................ | 703/2 |
| 6,425,762 B1 * | 7/2002 | Ernst | ............................... | 434/29 |
| 6,944,584 B1 * | 9/2005 | Tenney et al. | .................... | 703/22 |
| 7,124,071 B2 * | 10/2006 | Rich et al. | ......................... | 703/16 |
| 7,178,112 B1 * | 2/2007 | Ciolfi et al. | ........................ | 703/2 |
| 7,324,931 B1 * | 1/2008 | Warlock | ............................ | 703/13 |
| 7,487,080 B1 * | 2/2009 | Tocci et al. | ....................... | 703/22 |
| 7,680,637 B1 * | 3/2010 | Wolodkin | .......................... | 703/6 |
| 7,739,081 B1 * | 6/2010 | Kierzenka et al. | ................ | 703/2 |
| 2003/0154451 A1 * | 8/2003 | Rassaian | ........................... | 716/4 |
| 2003/0195726 A1 * | 10/2003 | Kondo | .............................. | 703/2 |
| 2004/0210426 A1 * | 10/2004 | Wood | ................................ | 703/2 |
| 2004/0210429 A1 * | 10/2004 | Yu et al. | ............................. | 703/9 |
| 2005/0216248 A1 * | 9/2005 | Ciolfi et al. | ..................... | 703/22 |
| 2006/0064670 A1 * | 3/2006 | Linebarger et al. | ........... | 717/106 |
| 2006/0282248 A1 * | 12/2006 | Kageyama et al. | ............. | 703/13 |
| 2009/0012754 A1 | 1/2009 | Mosterman et al. | | |

OTHER PUBLICATIONS

Levitan et al. "Systems Simulation of Mixed-Signal Multi-Domain Microsystems with Piecewise Linear Models": IEEE Transactions on Computer-Aided Design of Integrated Circuits and Systems- vol. 22, No. 2, Feb. 2003.*

Engelson et al. "A Design, Simulation, and Visualization Environment for Object-Oriented Mechanical and Multi-Domain Models in Modelica", Jul. 1999.*

(Continued)

*Primary Examiner* — David Silver
*Assistant Examiner* — Shambhavi Patel
(74) *Attorney, Agent, or Firm* — Cesari and McKenna, LLP; Michael R. Reinemann

(57) ABSTRACT

In a graphical modeling environment supporting a model having at least two different analysis frameworks operating therein, a system and corresponding method of processing the graphical model modify the model to group model portions together for processing in the same analysis framework. Model parts are identified and associated with the analysis framework in which they operate. Model parts are then grouped based on their association with their analysis framework to form model portions that operate in one of the different analysis frameworks. In instances where topological separation of model portions operating in the same analysis framework occurs, the system and method reconfigure intervening model portions to be amenable with operation in the analysis framework of the surrounding model portions to improve processing efficiency.

37 Claims, 13 Drawing Sheets

OTHER PUBLICATIONS

Griffith et al. "Mixed Frequency/Time Domain Analysis of Nonlinear Circuits", IEEE Transactions on Computer-Aided Design, vol. 11, No. 8, Aug. 1992.*

Martinez et al. "Mixed-Technology System-Level Simulation", Analog Integrated Circuits and Signal Processing, 29, 127-149, 2001.*

Fritzson et al. "An Integrated Modelica Environment for Modeling, Documentation, and Simulation", Proceedings of the 1998 Summer Computer Simulation Conference (SCSC '98) Jul. 19-22, 1998.*

Cubert et al. "MOOSE: An Object-Oriented Multimodeling and Simulation Application Framework", 1997.*

Buck et al. "Ptolemy: A Framework for Simulating and Prototyping Heterogenous Systems", Aug. 1992.*

Devarajan et al. "Multi-Domain Modeling and Simulation of a Linear Actuation System", 2003.*

El-khoury et al. "Towards a Toolset for Architectural Design of Distributed Real-Time Control Systems", IEEE 2001.*

The MathWorks, Inc. "SimMechanics, for use with Simulink" User's Guide, Version 2, 2001; 4:1-7.

"SimMechanics: User's Guide Version 2," The MathWorks, Inc., Mar. 2005, pp. i to x, 1-1 to 1-26, 2-1 to 2-58, 3-1 to 3-24, 4-1 to 4-76, 5-1 to 5-34, 6-1 to 6-38, 7-1 to 7-47, 8-1 to 8-40, 9-1 to 9-216, 10-1 to 10-10, A-1 to A-4, B-1 to B-2, Glossary-1 to Glossary-20, and Index-1 to Index-6.

"SimDriveline: User's Guide Version 1," The MathWorks, Inc., Mar. 2005, pp. i to iv, 1-1 to 1-22, 2-1 to 2-64, 3-1 to 3-28, 4-1 to 4-6, 5-1 to 5-90, A-1 to A-4, B-1 to B-2, and Index-1 to Index-2.

Mosterman, Peter J., "An Overview of Hybrid Simulation Phenomena and Their Support by Simulation Packages," Lexture Notes In Computer Science, vol. 1569, Proceedings of the Second International Workshop on Hybrid Systems: Computation and Control, 1999, pp. 1-10.

Otter, Martin, et al., "Hybrid Models of Physical Systems and Discrete Controllers," at- Automatisierungstechnik, vol. 48, No. 9, Sep. 2000, pp. 1-12.

Denckla, Ben, et al., "Formalizing Causal Block Diagrams for Modeling a Class of Hybrid Dynamic Systems," $44^{th}$ IEEE Conference on Decision and Control, Seville, Spain, Dec. 12-15, 2005, pp. 1-6.

Mosterman, Peter J., et al., "Computer Automated Multi-Paradigm Modeling in Control System Design," Proceedings of the IEEE International Symposium on Computer-Aided Control System Design (CACSD00), Anchorage Hilton, Anchorage, Alaska, USA, Sep. 25-27, 2000, pp. 1-6.

Mosterman, Peter J., et al., "An Introduction to Computer Automated Multi-Paradigm Modeling," Simulation: Transactions of the Society for Modeling and Simulation International, vol. 80, No. 9, Editor Choice Article, May 26, 2004, pp. 1-16.

* cited by examiner

SYSTEM AND METHOD FOR GRAPHICAL MODEL PROCESSING

FIELD OF THE INVENTION

The present invention relates to a system and method for processing models, and more particularly to a system and method for efficiently handling graphical models that contain parts that are modeled using different, domain-specific, analysis frameworks.

BACKGROUND OF THE INVENTION

A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc.

Professionals from diverse areas such as engineering, science, education, and economics build mathematical models of dynamic systems in order to better understand system behavior as it changes with the progression of time. The mathematical models aid in building "better" systems, where "better" may be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may also serve an educational purpose of educating others on the basic principles governing physical and physics systems. The models and results are often used as a scientific communication medium between humans. The term "model-based design" is used to refer to the use of graphical models in the development, analysis, and validation of dynamic systems, and can additionally include development, analysis, and validation of static systems, parametric systems, probabilistic systems, and the like.

Dynamic systems are typically modeled in simulation environments as sets of differential, difference, and/or algebraic equations. At any given instant of time, these equations may be viewed as relationships between the system's output response ("outputs"), the system's input stimuli ("inputs") at that time, the current state of the system, the system parameters, and time. The state of the system may be thought of as a numerical representation of the dynamically changing configuration of the system. For instance, in a physical system modeling a simple pendulum, the state may be viewed as the current position and velocity of the pendulum. Similarly, a signal-processing system that filters a signal would maintain a set of previous inputs as the state. The system parameters are the numerical representation of the static (unchanging) configuration of the system and may be viewed as constant coefficients in the system's equations. For the pendulum example, a parameter is the length of pendulum and for the filter example; a parameter is the values of the filter taps.

Various classes of graphical models describe computations that can be performed on computational hardware, such as a computer, microcontroller, FPGA, and custom hardware. Generally, graphical analysis and simulation methods, such as the block diagram method, are used in modeling for design, analysis, and synthesis of engineered systems. The visual representation allows for a convenient interpretation of model components and structure and provides a quick intuitive notion of system behavior. Modeling is the process of abstracting away aspects of reality to arrive at a formal representation of the system characteristics that are pertinent to solving a problem. For example, in case the step response of a system is to be optimized, a model can be designed that captures the dynamics of the system. If, however, the layout of components of the same system needs to be determined, a model that captures the geometrics of the components involved can be effectively applied. The dynamic model would be inappropriate for the latter task.

Given the many different problems that need to be addressed in system design, a multitude of models is typically used. Each of these models may address very specific characteristics, and, as such, it is desirable to have a dedicated language available to represent the model.

For example, consider modeling the dynamics of a controlled system. On many occasions, these are modeled using differential equations. Therefore, a suitable language, or analysis framework, to be used could be time-based block diagrams such as found in Simulink®. Those time-based block diagrams are of little use to model the geometries, which is better addressed by using Computer-Aided Design (CAD) tools such as SolidWorks® by SolidWorks Corporation of Concord, Mass.

Similarly, dedicated analysis frameworks each having dedicated algorithms are desired for modeling, for example, electrical circuits, multi-body systems, driveline systems, hydraulic systems, reactive control systems, closed loop control systems, and software systems. To facilitate the convenience of such high-level and dedicated analysis frameworks requires sophisticated technology that translates the model into a representation that can be used by an execution engine. This translation can proceed by generating an executable representation that in one step or several steps can move the original high-level model through a number of intermediate representations before arriving at an executable representation.

By analysis framework, what is meant generally is a structure for processing a portion or all of a model to obtain a result. Analysis frameworks can be broadly defined by the particular dedicated algorithms that are used during the processing step, such that model components requiring different dedicated algorithms to be processed would be classified as operating in different analysis frameworks. It should be noted, however, that components of a model requiring dedicated algorithms that differ only insubstantially may be classified as operating in a same analysis framework, such that minor algorithm differences may not be definitive of different analysis frameworks. Additionally, analysis frameworks can include both graphical and non-graphical model environments.

An important distinction between analysis frameworks is whether they apply to causal or non-causal models or model portions. In this context, causal model portions are those for which all entities in the model portion have fixed input and output variables. Non-causal model portions include entities that have interface variables that may be input and output. Whether such interface variables are considered input or output is inferred by analysis of the computational dependencies in the model portion and not a priori determined by the model designer.

For example, in an electrical circuit model portion, an entity may be an electrical resistor. This resistor has two ports (one defined to be at the positive electrical potential and one at the negative electrical potential) across which energy can be exchanged with other electrical components. These two ports have two interface variables each, the electrical potential and the electrical current. It is not known a priori whether the current is computed based on the potential difference or whether the current is computed based on the voltage difference. This depends on whether the electrical resistor is driven by a voltage or a current, and this computational causality can be inferred once the computational dependencies of the model portion are known.

In many cases, two or more dedicated analysis frameworks are required in a single model to address different, but interacting, aspects of the system. In such an instance, it is desirable to ultimately translate the different model parts into a common representation that is shared by all different analysis frameworks involved. For example, in the instance where a multi-body specific analysis framework is used alongside a differential equation analysis framework in the same model, the multi-body model part can first be translated into a differential equation representation. After this, the entire model is described in terms of differential equations and the common representation can now be mapped onto an executable form, which could be, for example, the compiled data structure as employed by Simulink®.

Looking at FIG. 1, a user 80 in this example designs a model that contains a multi-body system modeled using the SimMechanics™ modeling application and a differential equation system that is modeled using block diagrams. The SimMechanics™ model part 81 is first translated into a block diagram representation 83 that can then be combined with a user designed block diagram representation 82 of the remainder of the model. The combined block diagram model is then translated into the Simulink® compiled representation 84 to be used for execution.

This example is illustrative of the use of separate translation stages. To implement the strategy illustrated in the figure, it is necessary to arrive at a common representation for all the different analysis frameworks present in the model and to eventually translate the common representation into an executable form.

A first known strategy for reducing the model to executable form is to generate the common representations as early as possible in the model processing as illustrated in FIG. 2. Generic algorithms are then applied to produce an executable representation from the common representation. In FIG. 2, the model contains a block diagram 85 and multi-body mechanical model part 86. A common representation 87 is first established in the form of a set of equations to combine the block diagram and mechanical analysis parts. Once both the block diagram and mechanical analysis parts are translated into equation sets, generic equation processing technology is applied to sort the equations into executable form 88. Once sorted, a final translation produces equivalent computer code 89 that is executed independently or by a simulation environment to solve the equations and return model results.

A second known strategy for reducing the model to executable form is to use dedicated algorithms can be used for each of the different model parts to produce an optimized common representation. This common representation may then be in a more processed state than in the alternative approach. In FIG. 3, a multi-body mechanical analysis part 90 is immediately translated into sorted equations 91. Because the equation processing is now limited to the multi-body domain, dedicated algorithms can be applied to arrive at a very efficient representation in terms of sorted equations. Next, these equations are translated into a block diagram model 92 that can be integrated with a block diagram model 93 as designed by the user. The combined block diagrams are then translated into a compiled form 94 that a software application such as Simulink® can execute to achieve model results.

In the second approach, as shown in FIG. 3, there is a need for a mechanism to designate the part of the model that needs to be processed in a dedicated manner. State of the art tools such as Simulink® employ demarcating blocks such as "sensors" and "actuators" to this end. The sensor and actuator blocks are types of demarcating blocks that represent the boundary between model parts where the direction in which the model parts affect each other is directed in one of the two possible directions and determined by the block type (sensor or actuator).

Dedicated processing of certain model parts arrives at a more efficient executable representation of the model part and the overall model. However, at present the means to determine the model part that can be processed by a dedicated method is substantially restricted.

SUMMARY OF THE INVENTION

There is a need for a system and method that can more efficiently identify portions of a model that operate within substantially the same analysis framework and group such portions together for processing. The present invention is directed toward further solutions to address this need.

In accordance with one embodiment of the present invention, in a graphical modeling environment on a computational device, a method of processing a graphical model having at least two different analysis frameworks operating therein is provided. The method includes providing the model formed of a plurality of model components, each model component of the plurality of model components operating within one of the at least two different analysis frameworks. Each analysis framework relies upon a different dedicated algorithm from other analysis frameworks to derive solutions during processing. The method continues with identifying a plurality of model parts, each of the plurality of model parts being formed of at least one of the plurality of model components, and then identifying the analysis framework corresponding with each of the plurality of model parts. Each of the plurality of model parts is grouped together to form a plurality of model portions. Each model portion operates in one of the at least two different analysis frameworks. At least two of the model portions operating in a same analysis framework are topologically separated by at least one model portion operating in an analysis framework different from the at least two model portions operating in the same analysis framework. The at least one model portion operating in the analysis framework different from the at least two model portions operating in the same analysis framework is transformed to operate in the same analysis framework as the at least two model portions operating in the same analysis framework. The same analysis framework is not an executable block diagram.

In accordance with aspects of the present invention, transforming includes processing the plurality of model portions according to a dedicated algorithm of the plurality of dedicated algorithms corresponding to the analysis framework of the at least two different analysis frameworks to achieve intermediate processing results for each analysis framework, and converting the intermediate processing results for each analysis framework into a single model portion having a single dedicated algorithm corresponding to a single analysis framework within the graphical representation.

In accordance with further aspects of the present invention, the graphical representation has a plurality of single model portions resulting from conversion of intermediate processing results, such that the graphical model is not limited to a single analysis framework. The graphical representation can have at least one model portion resulting from conversion of intermediate processing results, such that the graphical model is limited to only a single analysis framework.

In accordance with further aspects of the present invention, the step of identifying a plurality of model parts includes recognizing a demarcating block to indicate boundaries of each model part of the plurality of model parts. Identifying the analysis framework can further include associating an analysis framework with the dedicated algorithm that corresponds to each of the plurality of model parts.

In accordance with further aspects of the present invention, each of the different dedicated algorithms derives sorted equations in block diagram form. The sorted equations can be at least partially formed of block diagram elements.

In accordance with further aspects of the present invention, the step of grouping each of the plurality of model parts together to form a plurality of model portions includes operating a selection mechanism to select and indicate which of the plurality of model parts is processed by the same dedicated algorithm, such that each of the resulting plurality of model portions is processed with a different dedicated algorithm.

In accordance with further aspects of the present invention, model parts are formed of at least one block. The at least one block is a polymorph block. The interpretation of the polymorph block can be based at least in part on an indication from a user based on interaction with the user.

In accordance with one embodiment of the present invention, in a computational device, a system for processing a graphical model formed of a plurality of model components, each model component of the plurality of model components operating within one of at least two different analysis frameworks, wherein each analysis framework relies upon a different dedicated algorithm from other analysis frameworks to derive solutions during processing, is provided. The system includes a part identification mechanism configured to identify a plurality of model parts, each of the plurality of model parts being formed of at least one of the plurality of model components. An analysis framework identification mechanism can be configured to identify the analysis framework corresponding with each of the plurality of model parts. A grouping mechanism can be configured to group each of the plurality of model parts together to form a plurality of model portions, wherein each model portion operates in one of the at least two different analysis frameworks, and wherein at least two of the model portions operating in a same analysis framework are topologically separated by at least one model portion operating in an analysis framework different from the at least two model portions operating in the same analysis framework. A transforming mechanism can be configured to modify the at least one model portion operating in the analysis framework different from the at least two model portions operating in the same analysis framework to operate in the same analysis framework as the at least two model portions operating in the same analysis framework. The same analysis framework is not an executable block diagram In accordance with aspects of the system of the present invention, the transforming mechanism can process the plurality of model portions according to a dedicated algorithm of the plurality of dedicated algorithms corresponding to the analysis framework of the at least two different analysis frameworks to achieve intermediate processing results for each analysis framework, and convert the intermediate processing results for each analysis framework into a single model portion having a single dedicated algorithm corresponding to a single analysis framework within the graphical representation.

In accordance with further aspects of the system of the present invention, the graphical representation can have a plurality of single model portions resulting from conversion of intermediate processing results, such that the graphical model is not limited to a single analysis framework. The graphical representation can have at least one model portion resulting from conversion of intermediate processing results, such that the graphical model is limited to only a single analysis framework.

In accordance with further aspects of the system of the present invention, the part identification mechanism can identify the plurality of model parts by recognizing a demarcating block in the model to indicate boundaries of each model part of the plurality of model parts.

In accordance wither further aspects of the system of the present invention, the analysis framework identifier mechanism can identify the analysis framework corresponding with each of the plurality of model parts by associating an analysis framework with the dedicated algorithm that corresponds to each of the plurality of model parts.

In accordance with further aspects of the system of the present invention, the grouping mechanism can group each of the plurality of model parts together to form a plurality of model portions by operating a selection mechanism to select and indicate which of the plurality of model parts is processed by the same dedicated algorithm, such that each of the resulting plurality of model portions is processed with a different dedicated algorithm.

In accordance with further aspects of the system of the present invention, model parts are formed of at least one block. The at least one block is a polymorph block. The interpretation of the polymorph block is based at least in part on an indication from a user based on interaction with the user.

In accordance with one embodiment of the present invention, a medium for use in a graphical modeling environment on a computational device is provided. The medium holds instructions executable using the computational device for performing a method of processing a graphical model having at least two different analysis frameworks operating therein. The method includes providing the model formed of a plurality of model components, each model component of the plurality of model components operating within one of the at least two different analysis frameworks. Each analysis framework relies upon a different dedicated algorithm from other analysis frameworks to derive solutions during processing. The method continues with identifying a plurality of model parts, each of the plurality of model parts being formed of at least one of the plurality of model components, and then identifying the analysis framework corresponding with each of the plurality of model parts. Each of the plurality of model parts is grouped together to form a plurality of model portions. Each model portion operates in one of the at least two different analysis frameworks. At least two of the model portions operating in a same analysis framework are topologically separated by at least one model portion operating in an analysis framework different from the at least two model portions operating in the same analysis framework. The at least one model portion operating in the analysis framework different from the at least two model portions operating in the same analysis framework is transformed to operate in the same analysis framework as the at least two model portions operating in the same analysis framework. The same analysis framework is not an executable block diagram

BRIEF DESCRIPTION OF THE DRAWINGS

The present invention will become better understood with reference to the following description and accompanying drawings, wherein.

DETAILED DESCRIPTION

Figure 1:
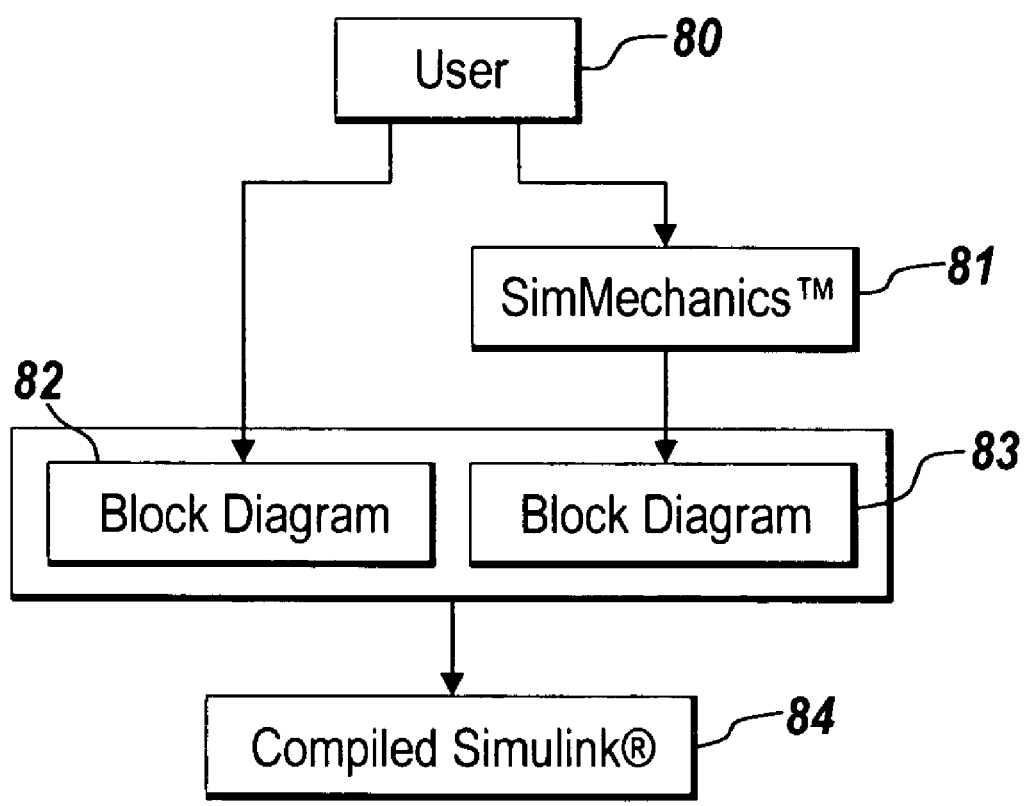
FIG. 1 is a diagrammatic illustration of a model having different analysis frameworks, according to one aspect of the present invention.
Figure 2:
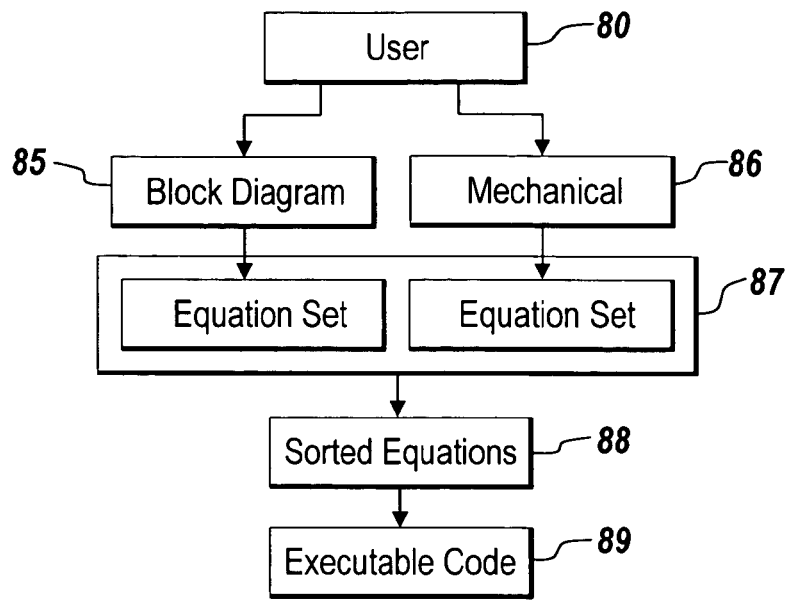
FIG. 2 is a diagrammatic illustration of a conventional approach to processing the model of FIG. 1, according to one aspect of the present invention.
Figure 3:
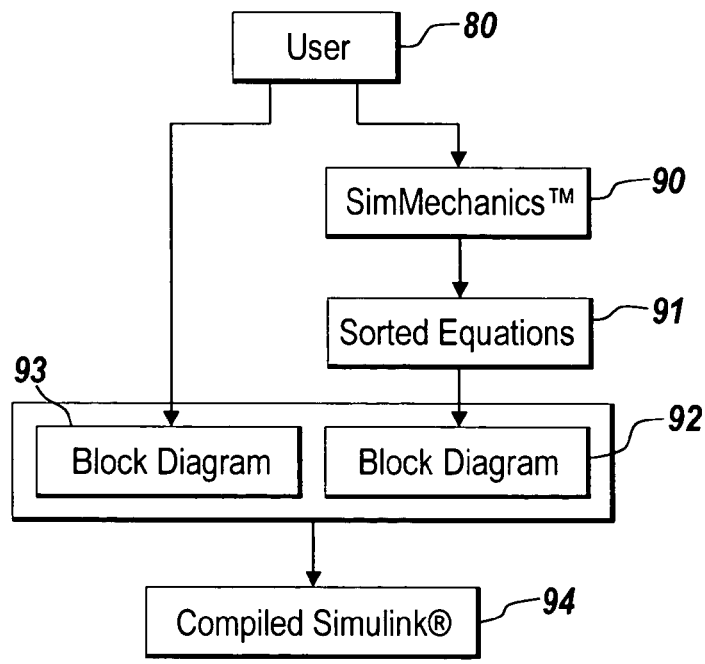
FIG. 3 is a diagrammatic illustration of an alternative conventional approach to processing the model of FIG. 1, according to one aspect of the present invention.

An illustrative embodiment of the present invention relates to a system and method for processing a graphical model having at least two different analysis frameworks operating therein. The method includes providing the model formed of a plurality of model components, each model component of the plurality of model components operating within one of the at least two different analysis frameworks. Each analysis framework relies upon a different dedicated algorithm for processing. A plurality of model parts are identified, each of the plurality of model parts being formed of at least one of the plurality of model components. The analysis framework corresponding with each of the plurality of model parts is then further identified. The model is then modified to group together model parts operating in the same analysis framework into model portions. Often, at this juncture, there are model portions operating in the same analysis framework that are nonetheless topologically separated by model portions operating in a different analysis framework. This is the result of the original configuration of the model and location of model components. Where possible, the present invention identifies such topologically separated model portions and modifies the separating model portions to be amenable to operation within the analysis framework of the surrounding model portions. The processing of the model can then be carried out in a more efficient manner as a result of the modified configuration where model portions operating in a like analysis framework are processed together.

FIGS. 1 and 4 through 14, wherein like parts are designated by like reference numerals throughout, illustrate example embodiments of a system and method for processing models according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed, such as the size, shape, or type of elements or materials, in a manner still in keeping with the spirit and scope of the present invention.

It should be noted that the present description makes reference to a number of different specific software applications, such as Simulink®, SimMechanics™, SimPowerSystems™, SimDriveline™, and the like, provided by The MathWorks, Inc. of Natick, Mass. However, as utilized herein, all such references to specific software applications are merely intended to demonstrate example embodiments of how the system and method for processing models in accordance with the present invention can be implemented with existing software tools. The present invention is by no means limited to use with only the software applications mentioned. Other modeling and simulation software applications can be utilized in conjunction with the present invention to improve processing efficiencies. As such, the present invention anticipates use with combinations of the specific software applications discussed, as well as use with combinations of other modeling or simulation software applications not specifically identified herein. For exemplary purposes, as utilized herein, Simulink® refers generally to a signal-based modeling application, SimMechanics™ refers generally to a physics and mechanics modeling application, SimPowerSystems™ refers generally to an electrical power modeling application, and SimDriveline™ refers generally to rotating machine mechanics modeling.

Figure 4:
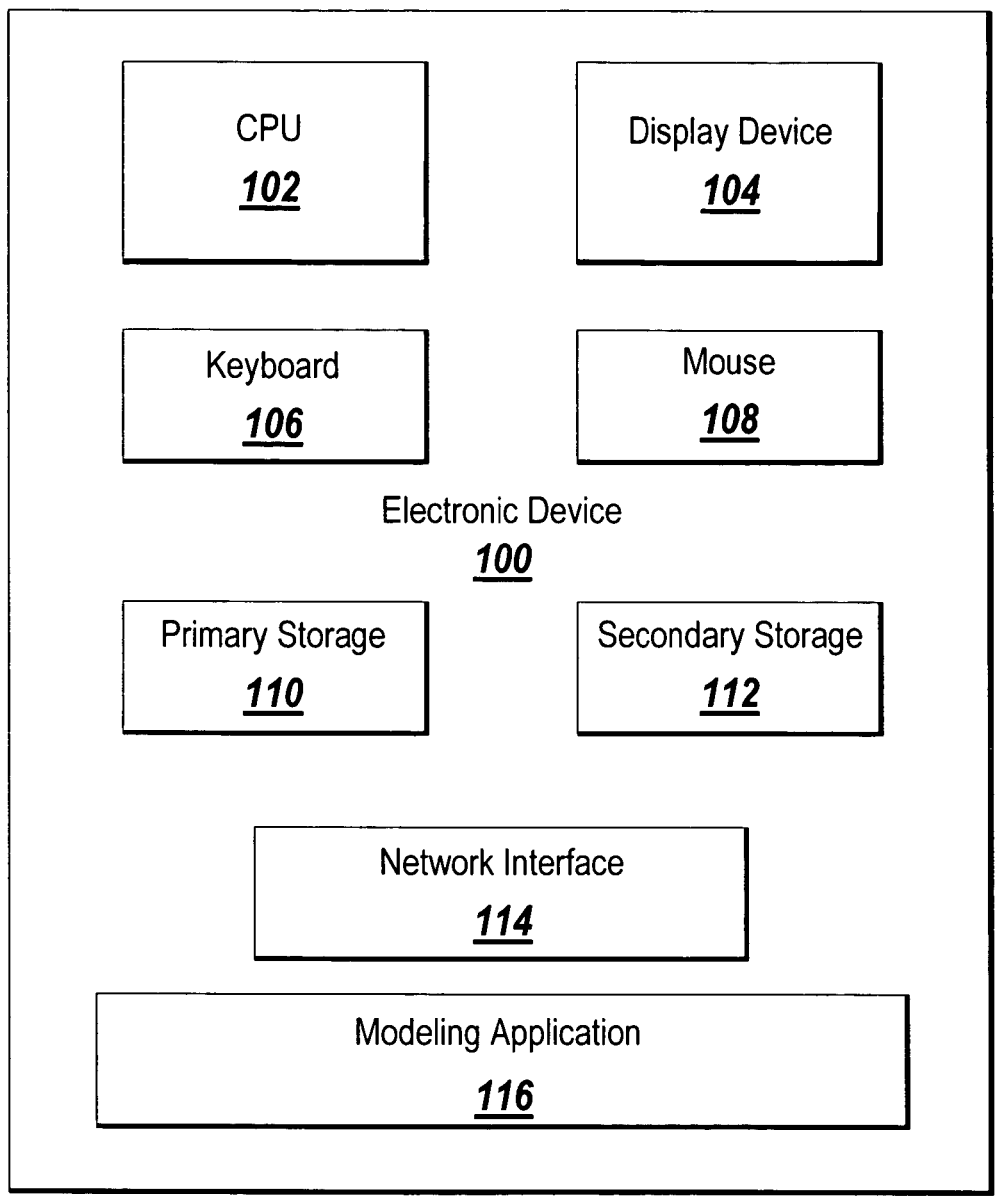
FIG. 4 is a diagrammatic illustration of a computational device for implementing the system and method of the present invention.

FIG. 4 illustrates one example embodiment of a computational device 100 suitable for practicing the illustrative embodiments of the present invention. The computational device 100 is representative of a number of different technologies, such as personal computers (PCs), laptop computers, workstations, personal digital assistants (PDAs), Internet appliances, cellular telephones, and the like. In the illustrated embodiment, the computational device 100 includes a central processing unit (CPU) 102 and a display device 104. The display device 104 enables the computational device 100 to communicate directly with a user through a visual display. The computational device 100 further includes a keyboard 106 and a mouse 108. Other potential input devices not depicted include a stylus, trackball, joystick, touch pad, touch screen, and the like. The computational device 100 includes primary storage 110 and secondary storage 112 for storing data and instructions. The storage devices 110 and 112 can include such technologies as a floppy drive, hard drive, tape drive, optical drive, read only memory (ROM), random access memory (RAM), and the like. Applications such as browsers, JAVA virtual machines, and other utilities and applications can be resident on one or both of the storage devices 110 and 112. The computational device 100 can also include a network interface 114 for communicating with one or more electronic devices external to the computational device depicted. A modem is one form of network interface 114 for establishing a connection with an external computational device or network. The CPU 102 has either internally, or externally, attached thereto one or more of the aforementioned components. In addition to other applications, modeling applications 116, can be installed and operated on the computational device 100.

It should be noted that the computational device 100 is merely representative of a structure for implementing the present invention. However, one of ordinary skill in the art will appreciate that the present invention is not limited to implementation on only the described device 100. Other implementations can be utilized, including an implementation based partially or entirely in embedded code, where no user inputs or display devices are necessary. Rather, a processor can communicate directly with another processor or other device. It should further be noted that the present invention is not limited to electronic media. The method and system can be implemented on any computational platform, such as optical or biological computers.

Figure 5:
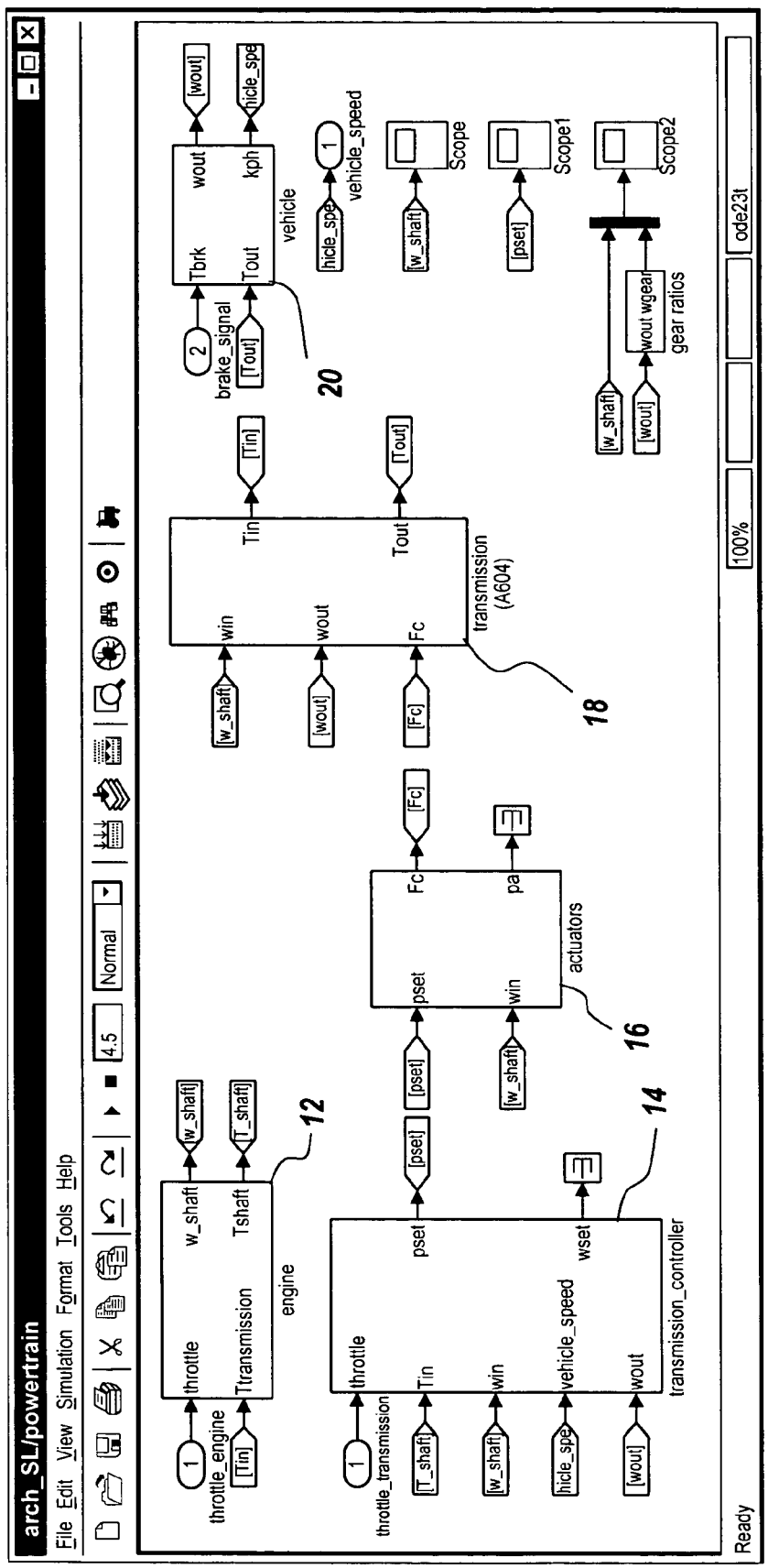
FIG. 5 is a schematic illustration of a model, according to one aspect of the present invention.

To better illustrate aspects of the present invention, an example model of a power train for an automobile captures a design process wherein different power train subsystems require different analysis frameworks to model accurately and conveniently. FIG. 5 is a diagrammatic illustration of an example power train model 10. The power train model includes an engine, a transmission, a transmission controller, and a vehicle. In the top-left corner, an engine model 12 is shown. Below the engine model 12 a transmission controller 14 is shown. To the right of the transmission controller 14, a transmission actuator model 16 is shown. To the right of the transmission actuator model 16, a transmission model 18 is shown. In the top-right corner, a vehicle model 20 is shown.

Once the architecture of the power train model 10 is defined, a user can experiment with different types of engines, different types of transmissions, and different types of vehicles to study and improve the performance of the overall combination. Such a modeling and experimenting process requires that the interfaces of each of the architectural primitives have the same interface.

To support physics modeling, Simulink® facilitates modeling tools that are specific to a particular domain, e.g., SimMechanics™ to the multi-body domain, SimPowerSystems™ to the power electronics domain, and SimDriveline™ to the driveline domain. These physics modeling languages are especially well-suited by means of energy-connections, i.e., a connection between blocks typically carries more than one variable and as such captures the flow of energy or power. For example, in SimDriveline™, each connection consists of a torque and angular velocity, the product of which is power.

Figure 6:
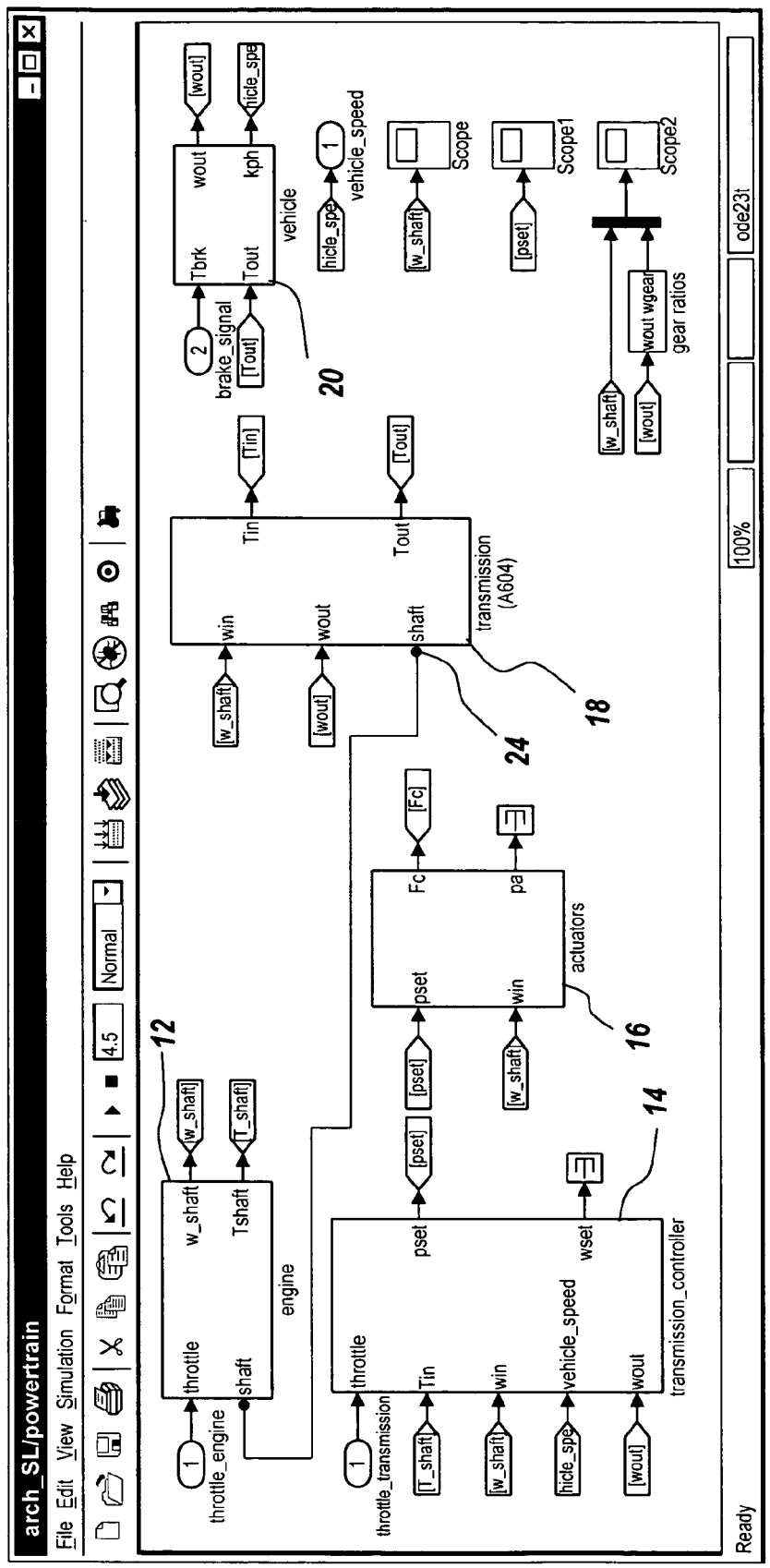
FIG. 6 is a schematic illustration of a modified version of the model of FIG. 5, according to one aspect of the present invention.

Using SimDriveline™ to model the engine and transmission plants, results in a slightly modified power train model 22, as shown in FIG. 6. Relative to the power train model 10 of FIG. 5, the modified power train model 22 has a SimDriveline™ connection 24, indicated by a round circle, which is different from the Simulink® signal connections, indicated by arrows throughout the model 22. The inclusion of the SimDriveline™ connection 24 in the Simulink® signal-based power train model 22 creates an incompatibility between the model components. Accordingly, the A604 transmission model 18 must use SimDriveline™ connections in its interface. As such, any other transmission models that are all Simulink® signal-based models, without the ability to receive SimDriveline™ connection data, are precluded from efficient usage in this power train model 22 prior to the introduction of the present invention.

The SimDriveline™ connection is useful to have the dedicated SimDriveline™ algorithms employed in generating an efficient executable model representation. If the engine model 12 and A604 transmission model 18 were connected by the signal interface as shown in FIG. 5, demarcating blocks in the form of sensors and actuators are required to separate out the SimDriveline™ model parts of the respective subsystems. As a result, two sets of ordered equations would be generated for the separate SimDriveline™ model parts, as shown in FIG. 1, and this leads to less efficient execution.

The system and method of the present invention automatically determines the model parts that can be processed by specific dedicated algorithms. The method automatically finds the maximum partitions in a model that still allow dedicated model processing.

Figure 7:
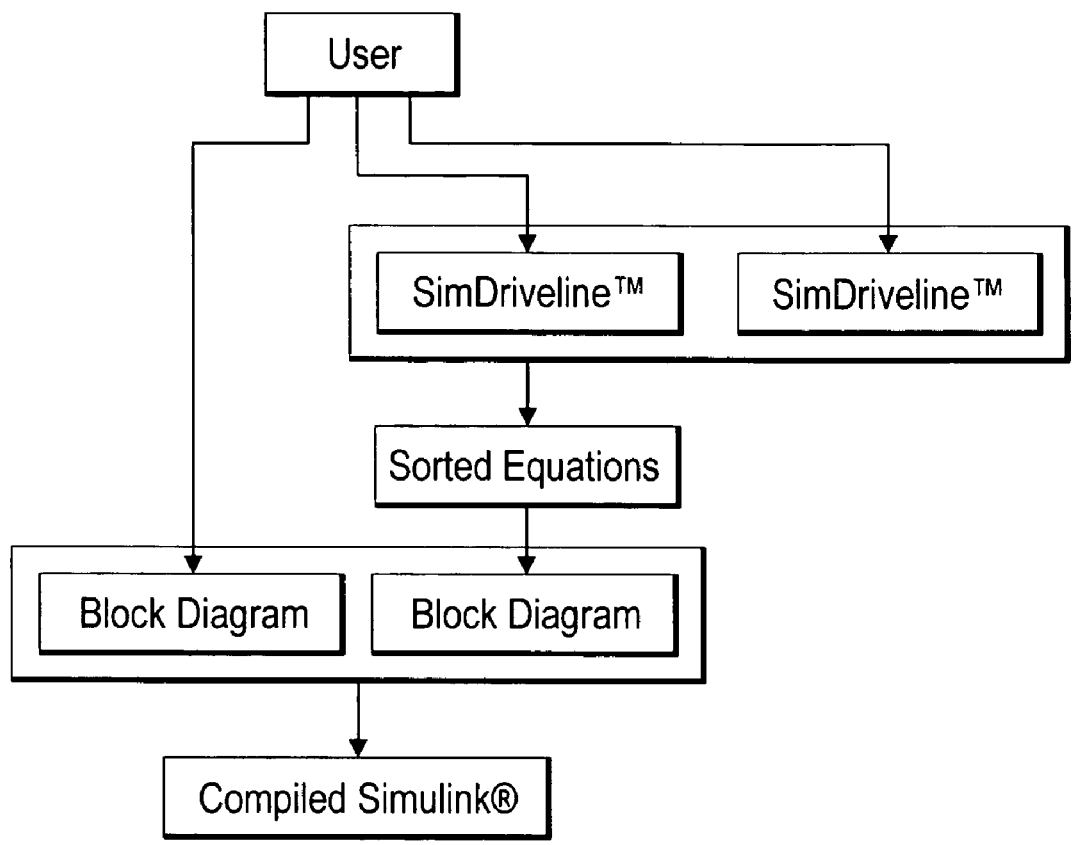
FIG. 7 is a diagrammatic illustration of the processing of the model of FIG. 6, according to one aspect of the present invention.

For example, for the power train model 10 shown in FIG. 5, if the architecture in FIG. 6 is used and the engine model 12 and A604 transmission model 18 contain separate SimDriveline™ model parts, the analysis stage of the present invention finds that the different parts can be processed as one. The arrangement for processing the architecture of FIG. 6 is shown in FIG. 7, where the two SimDriveline™ model parts are combined and then processed into one set of sorted equations. These sorted equations are then made available in block diagram format, for combination with the rest of the model, which consists of block diagrams. Model parts can also be processed in different ways. For example, a gain block can be utilized in a mechanical body analysis framework to model velocity and force as a polymorph block.

Figure 8:
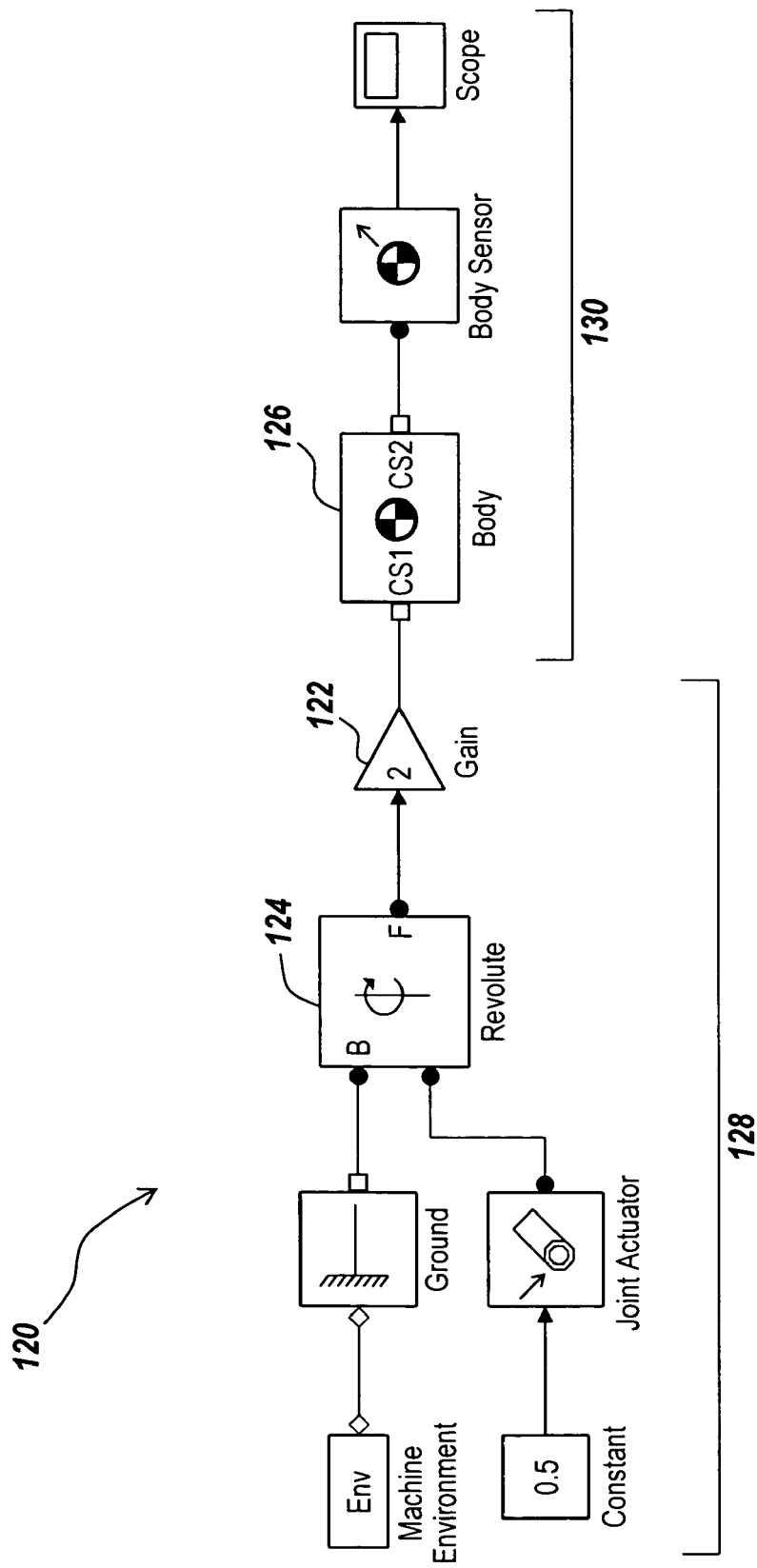
FIG. 8 is a diagrammatic illustration of a model, according to one aspect of the present invention.

To illustrate, consider the SimMechanics™ model 120 in FIG. 8. Here, a Gain block 122 that is part of the executable block diagram domain connects a Revolute block 124 and a Body SimMechanics™ block 126. There is no explicit demarcation between an executable block diagram domain 128 and SimMechanics™ blocks 130 by means of sensors and/or actuators. The Gain block 122 is automatically identified as being an element of the executable block diagram domain and its behavior is interpreted in the SimMechanics™ domain. In accordance with one embodiment of the invention, the functionality of the Gain block 122 is applied to the force that acts between the Revolute block 124 and the Body SimMechanics™ block 126 by multiplying the force by a factor 2, for example, or the reciprocal, depending on the computational direction of the force and the input/output relation of the Gain block 122. If the force is computed on the input of the Gain block 122, the factor of 2 is applied, if the force is computed on the output, the reciprocal factor of 0.5 is applied. One of ordinary skill in the art will appreciate that other gain factors can be applied in this example.

In another embodiment of the invention, the Gain factor is applied similarly to both velocity and force. In yet another embodiment the Gain factor is applied similarly to only the velocity. One skilled in the art will recognize that similar applications of polymorph behavior can be devised without departing from the scope of the present invention.

Figure 9A:
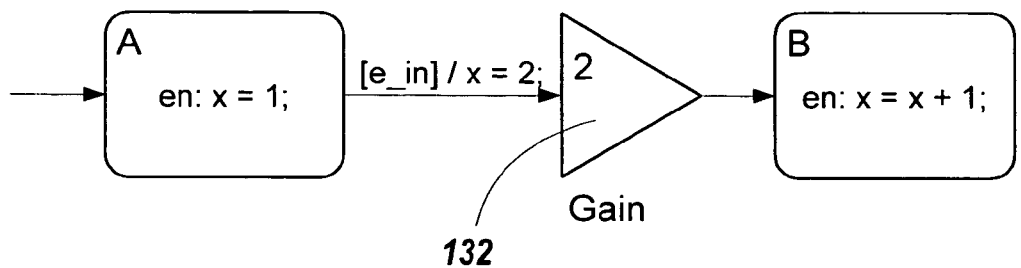
FIGS. 9A and 9B are a diagrammatic illustrations of the processing of the model of FIG. 8, according to one aspect of the present invention.
Figure 9B:
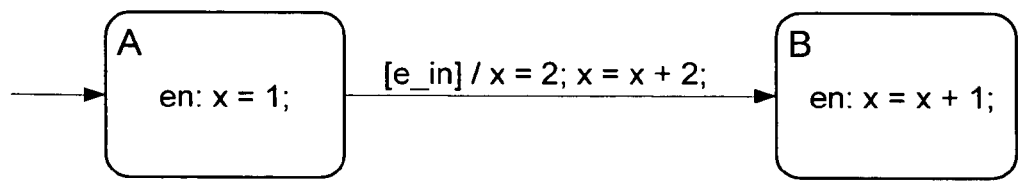

Similarly, such polymorphism can be applied in different domains. For example, the use of a Gain block 132 in a Stateflow® model could be interpreted as a multiplication of sorts that fits the Stateflow® analysis framework. Referring now to FIGS. 9A and 9B, a Stateflow® diagram is shown in FIG. 9A that consists of two states A and B. Upon initialization, state A is entered and the output x is set to the value 1. When the condition e_in becomes true, the transition out of state A is taken, which first changes the value of x to 2. Next, the Gain block 132 is interpreted as a multiplication of values assigned in the transition and so the value of x becomes 4. Finally, state B is entered and the entry action increments x by 1. The final value of x after the transition is, therefore, 5. To achieve this behavior, the polymorph Gain block 132 can first be translated to fit the Stateflow® analysis framework as shown in FIG. 9B.

In accordance with one embodiment of the invention, the demarcating of model portions that can be operated on by different analysis frameworks is achieved by dedicated blocks such as sensor and actuator blocks. In accordance with another embodiment of the invention, the model portions that can be operated on by different analysis frameworks that are identified by the types of blocks, by identifying the types of ports used for the connection, or by identifying the types of connections. Those of ordinary skill in the art will appreciate that further means to demarcate model portions that can be operated on by different analysis frameworks can be devised without departing from the scope of the invention.

Figure 10:
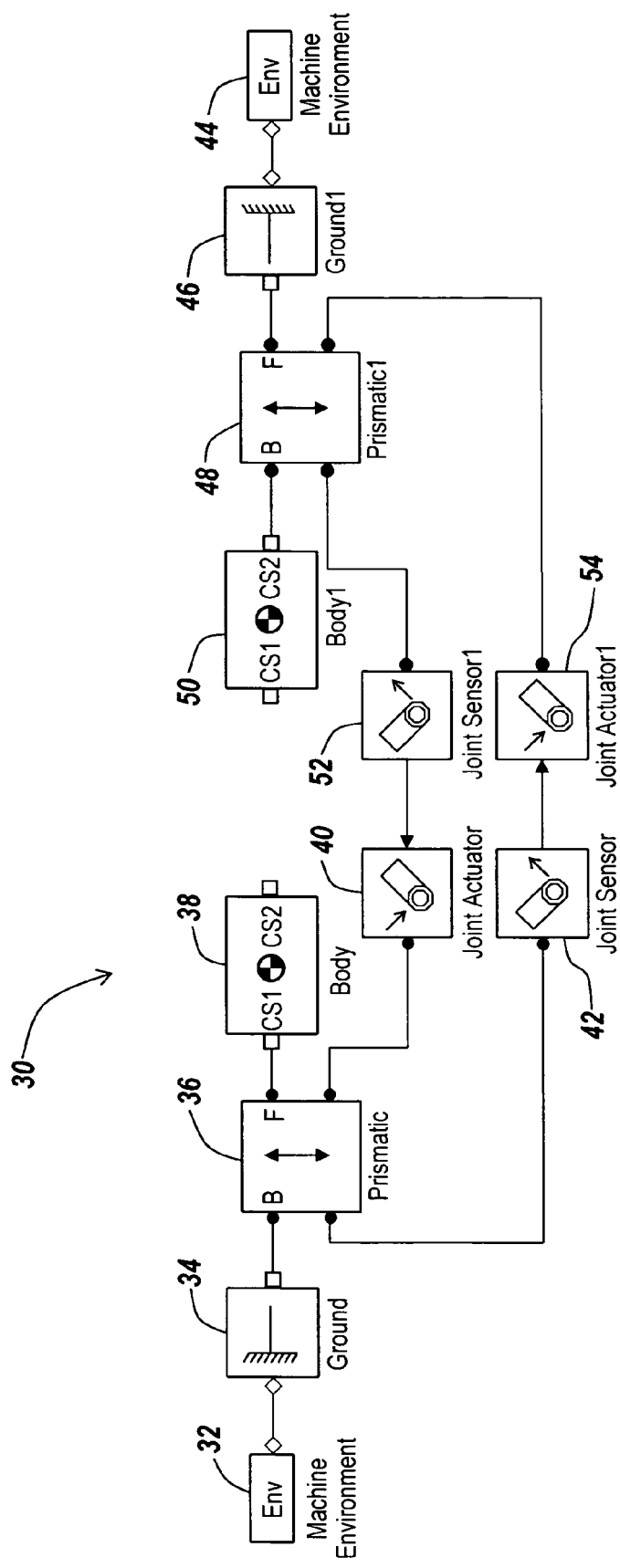
FIG. 10 is a schematic illustration of a model, according to one aspect of the present invention.

Turning now to a different illustrative example as shown in FIG. 10, the method of processing a graphical model having at least two different analysis frameworks operating therein occurs as described below.

In FIG. 10, an example model 30 is shown. The model 30 includes a first machine environment model 32, a first ground model 34, a first prismatic model 36, and a first body model 38. The model further includes a second machine environment model 44, a second ground model 46, a second prismatic model 48, and a second body model 50. The model parts are separated by demarcating sensor and actuator blocks in the form of a first joint actuator 40, a first joint sensor 42, a second joint actuator 54, and a second joint sensor 52. Accordingly, the model parts are separated by sensors 42 and 52, and actuators 40 and 54.

Figure 11:
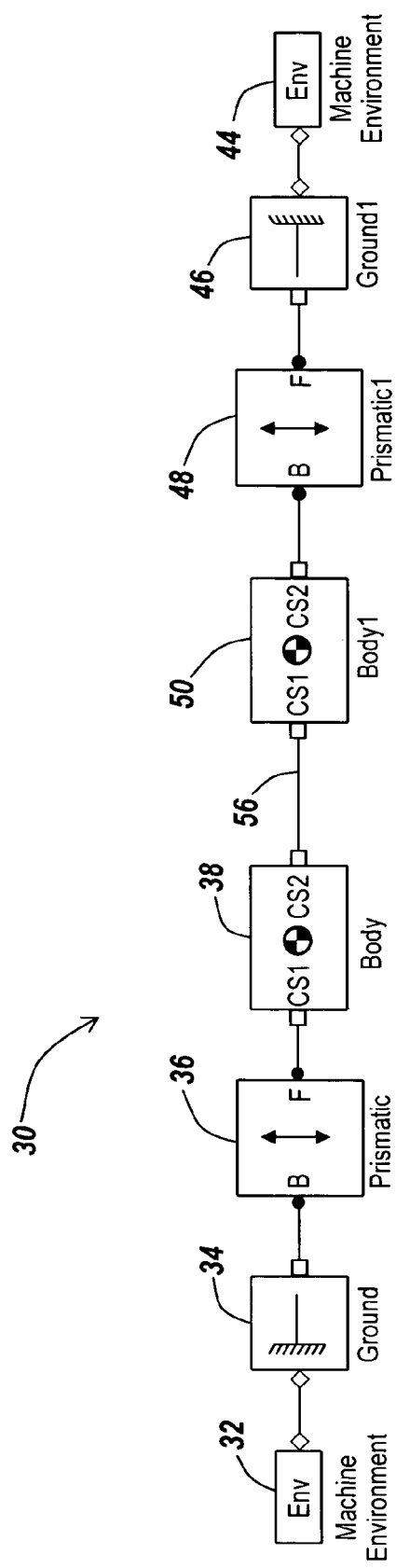
FIG. 11 is a schematic illustration of a modified version of the model of FIG. 10, according to one aspect of the present invention.

In accordance with the present invention, components within a model that are separated by demarcating blocks such as sensors and actuators are first identified. The demarcating blocks provide a logical separation between components that themselves operate within a single analysis framework. Components separated by demarcating blocks can operate within a same analysis framework, or a different analysis framework. In accordance with the present invention, the method analyzes whether there are demarcating block combinations that separate model parts that can be processed by the same dedicated algorithms. If such situations exist, the demarcating blocks, such as the sensor/actuator pairs, are removed and the model parts are merged according to the properties selected on the sensor/actuator pair, resulting in modification of the model 30 to that which is shown in FIG. 11. It should be noted that this modified model is only shown for illustrative purposes. It is not an essential part of the embodiment of the invention to generate the modified model in a block diagram representation first.

The first joint actuator 40, first joint sensor 42, second joint actuator 54, and second joint sensor 52 are used to allow connecting mechanical body analysis framework blocks to regular Simulink® signal blocks. However, in this example, no Simulink® blocks are present between each connected sensor/actuator pair (first joint actuator 40, first joint sensor 42, second joint actuator 54, and second joint sensor 52). Therefore, the two mechanical body analysis framework blocks (i.e., SimMechanics™ model parts) can be combined as if a direct connection between the first body model 38 and the second body model 50 existed, as shown in FIG. 11.

After the mechanical body analysis framework blocks (i.e., SimMechanics™ model parts) are identified, the sensor/actuator pairs are analyzed. In FIG. 10, the two sensor/actuator pairs (i.e., first joint actuator 40, first joint sensor 42, second joint actuator 54, and second joint sensor 52) are found to operate on the same bodies in two different SimMechanics model parts (i.e., the first body model 38 and the second body model 50). Moreover, one sensor/actuator pair operates on the force between the bodies and the other on the velocity. Such an arrangement is identical to a direct power connection that carries both force and velocity as across and through variables. The sensor/actuator pairs (first joint actuator 40, first joint sensor 42, second joint actuator 54, and second joint sensor 52) are replaced by a direct connection 56, as shown in FIG. 11. This model can be maintained as an internal configuration, or can be displayed to the user.

Figure 12:
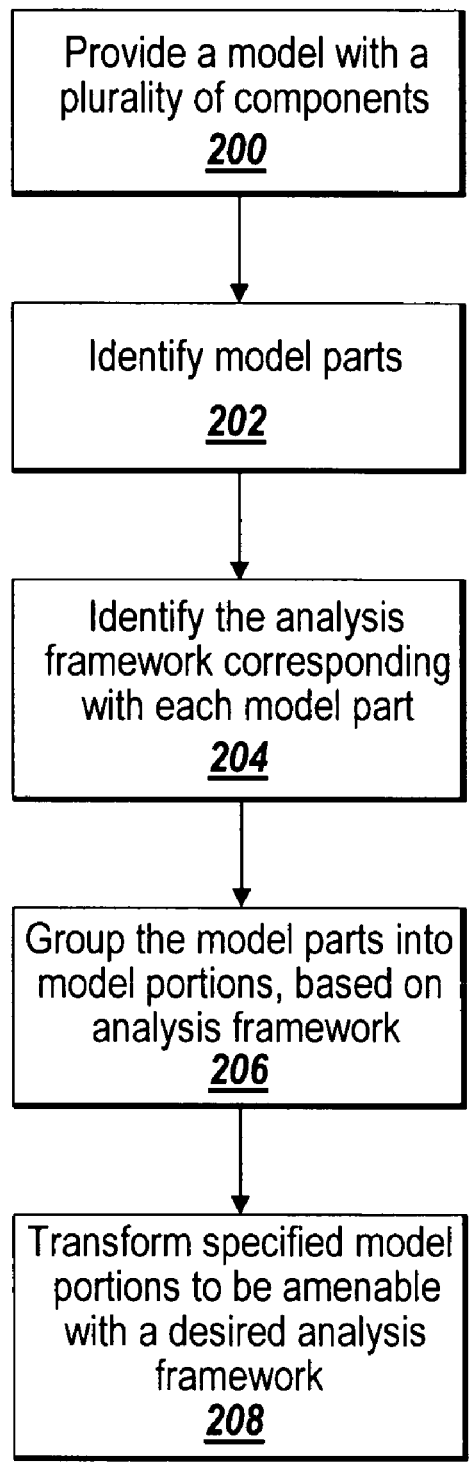
FIG. 12 is a flowchart illustrating a method of processing a model, according to one aspect of the present invention.
Figure 13:
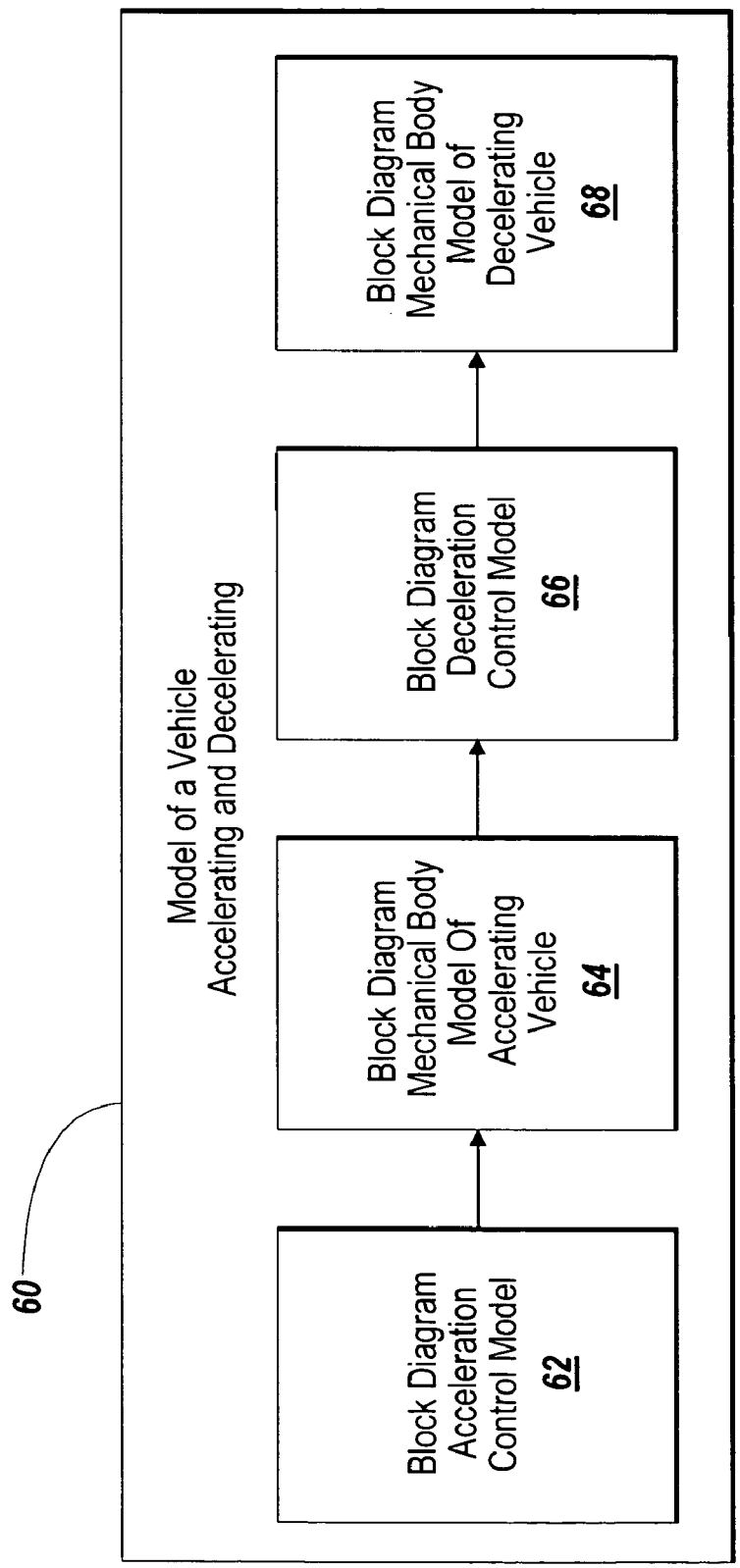
FIG. 13 is a schematic illustration of a model having topologically separated components of similar analysis frameworks, according to one aspect of the present invention.
Figure 14:
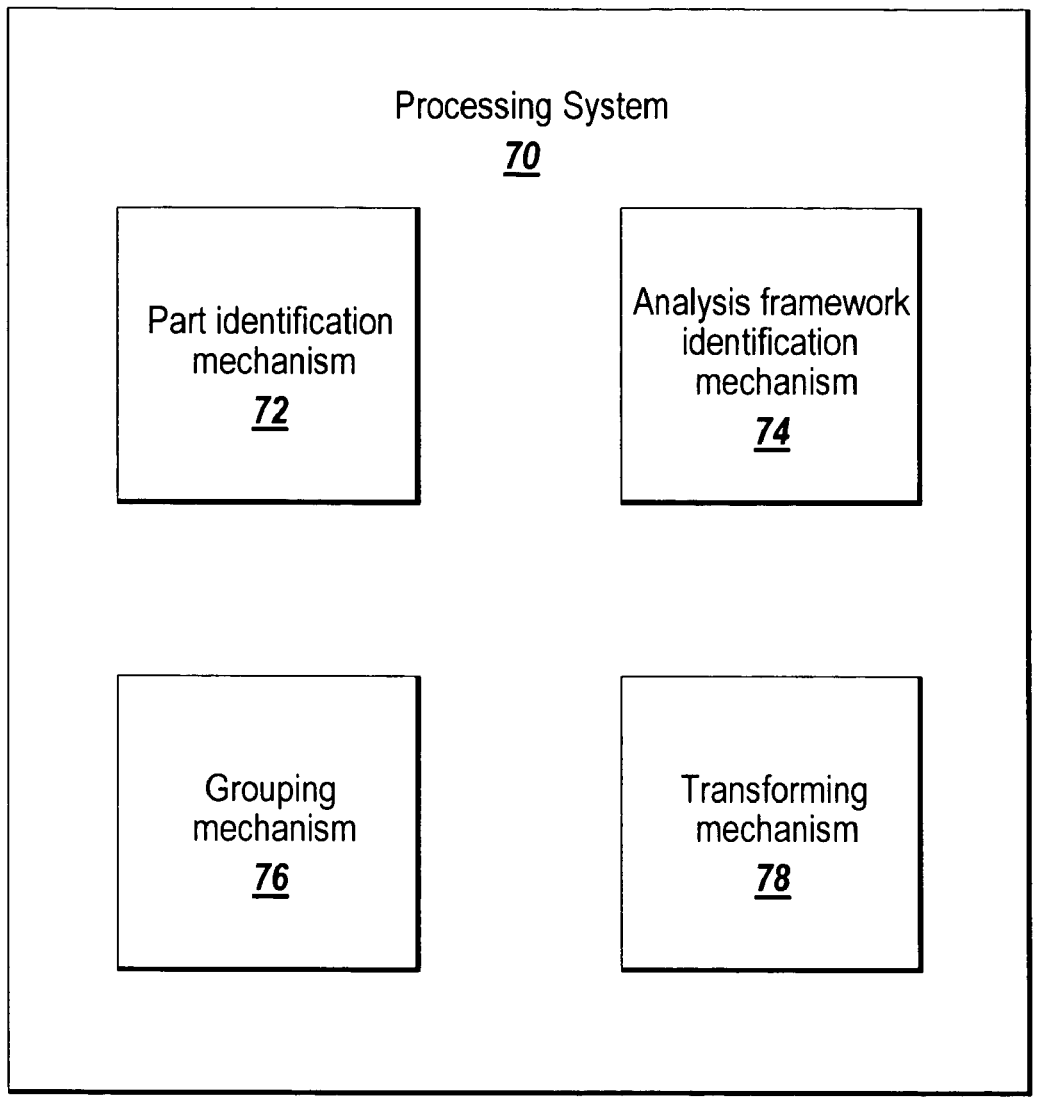
FIG. 14 is a diagrammatic illustration of the system for processing the model, according to one aspect of the present invention.

Taking the above discussion one step further beyond a model having multiple model parts in a same analysis framework, FIG. 12 is a flowchart illustrating one example embodiment of the method of processing a graphical model having at least two different analysis frameworks operating therein in accordance with the present invention. FIG. 13 is a diagrammatic illustration of a model 60 undergoing the method of processing shown in FIG. 12. First, the model 60 is provided, being formed of a plurality of model components (step 200). Each model component of the plurality of model components operates within an analysis framework. As discussed previously, each analysis framework is defined upon its reliance on a different dedicated algorithm to process and derive solutions. Model components can be formed of at least one block, such as a polymorph block. Further, the interpretation of the polymorph block for purposes of the following method can be based at least in part on an indication from a user based on interaction with the user.

The example model 60 represents acceleration and deceleration of a vehicle. There is a control signal analysis framework in which an acceleration control model 62 operates, a mechanical body analysis framework in which a mechanical body model of an accelerating vehicle 64 operates, a control signal analysis framework in which deceleration control model 66 operates, and a mechanical body analysis framework in which a mechanical body model of a decelerating vehicle 68 operates. As can be seen, the mechanical body analysis frameworks are topologically separated from the control signal analysis frameworks.

Each of the model 60 parts is identified (step 202) and the analysis framework corresponding with each of the plurality of model parts is likewise identified (step 204). Each of the model parts is grouped together to form a plurality of model portions (step 206). Each model portion operates in one of the different analysis frameworks. In some instances, such as in the example model 60, model portions that use the same dedicated algorithms and thus the same analysis framework are topologically separated by at least one model portion operating in a different analysis framework. In the example model 60, the acceleration control model 62 and the deceleration control model 66 operate in the control signal analysis framework, and they are separated by the model of the accelerating vehicle 64 and the model of the decelerating vehicle 68, which operate in the mechanical body analysis framework and are likewise topologically separated themselves. Each of the components that separate the acceleration control model 62 and the deceleration control model 66 operate in a different analysis framework than the mechanical body analysis framework of the model of the accelerating vehicle 64 and the model of the decelerating vehicle 68. Grouping each of the plurality of model parts together to form a plurality of model portions can be accomplished by operating a selection mechanism to select and indicate which of the plurality of model parts is processed by the same dedicated algorithm. Each of the resulting model portions is processed with a different dedicated algorithm corresponding to the analysis framework, as described below.

The method continues with transforming the model portions operating in the analysis framework different from the at least two model portions operating in the same analysis framework to operate in the same analysis framework as the at least two model portions operating in the same analysis framework (step 208). In the example model 60, the model of the accelerating vehicle 64 and the model of the decelerating vehicle 68 are separated by the deceleration control model 66. Accordingly, the deceleration control model 66 is transformed to be amenable to the mechanical body analysis framework of the model of the accelerating vehicle 64 and the model of the decelerating vehicle 68.

The model can then be processed using the dedicated algorithms for the particular analysis framework that was identified. Each of the different dedicated algorithms can derive sorted equations in block diagram form. The sorted equations can be at least partially formed of block diagram elements, if desired.

The method of transforming, in accordance with one embodiment, includes processing model portions according to a dedicated algorithm corresponding to the analysis framework to achieve intermediate processing results for each analysis framework. The intermediate processing results for each analysis framework are then converted into a single model portion having a single dedicated algorithm corresponding to a single analysis framework within the model. The model can thus have a plurality of single model portions resulting from conversion of intermediate processing results, such that the graphical model is not limited to a single analysis framework. Alternatively, the model can thus have a plurality of model portions resulting from conversion of intermediate processing results in a manner such that the graphical model is limited to a single analysis framework Referring to FIG. 14, the method of the present invention can be carried out on a computational device, such as that described in FIG. 4, by a processing system 70. The system 70 for processing the graphical model is designed to handle models having a plurality of model components, where each model component operates within one of at least two different analysis frameworks. Such that each model that can make use of the processing system 70 fully has two or more analysis frameworks operating within the model. Each analysis framework relies upon a different dedicated algorithm to derive solutions during processing. The system 70 can include a part identification mechanism 72. The part identification mechanism is configured to identify a plurality of model parts, each part being formed of at least one of the plurality of model components.

An analysis framework identification mechanism 74 is configured to identify the analysis framework corresponding with each of the plurality of model parts. A grouping mechanism 76 is configured to group each of the plurality of model parts together to form a plurality of model portions. Each of the model portions operates in one of the analysis frameworks of the model. At least two of the model portions operate in the same analysis framework, but are topologically separated by at least one model portion operating in a different analysis framework.

A transforming mechanism 78 is configured to modify the at least one model portion operating in the analysis framework that is topologically separating the other model portions to be operationally amenable to working in the analysis framework of the portions being separated. As such, the transforming mechanism 78 returns a model portion that can be processed in a different analysis framework from its original analysis framework, one that is compatible with other topologically surrounding model portions. Such a configuration improves the processing efficiency of the model.

In accordance with the present invention, components within a model that are separated by demarcating blocks are first identified. The demarcating blocks, such as sensors and actuators, provide a logical separation between components that themselves operate within a single analysis framework. Components separated by demarcating blocks can operate within a same analysis framework, or a different analysis framework. In instances where the analysis framework is different there may be opportunity for the method of the present invention to improve processing of that model as described herein. In such instances, the method analyzes whether there are sensor/actuator combinations that separate model parts that can be processed by the same dedicated algorithms. If such situations exist, the exemplary sensor/actuator pairs are removed and the model parts are merged according to the properties selected on the sensor/actuator pair.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

What is claimed is:

1. In a graphical modeling environment on a computational device having at least one physical processing element coupled to a memory, a method of processing an executable graphical model having at least two different analysis frameworks operating therein, the graphical model representing, at least in part, a physical device, the method comprising:

storing the graphical model formed of a plurality of model components and at least one demarcating block in the memory, each model component of the plurality of model components operating within one of the at least two different analysis frameworks, wherein each analysis framework relies upon a different dedicated algorithm from other of the analysis frameworks to derive solutions during processing;

automatically identifying a plurality of model parts of the graphical model, using a first physical processing element, each of the plurality of model parts being formed of at least one of the plurality of model components, at least one of the model parts identified by recognizing the at least one demarcating block within the graphical model, is the at least one demarcating block connecting the at least one model part being identified to a second model part and indicating a boundary of the least one model part;

identifying the analysis framework corresponding with each of the plurality of model parts, using the first physical processing element or a second physical processing element;

automatically grouping each of the plurality of model parts together to form a plurality of model portions, using the first physical processing element, the second physical processing element or a third physical processing element, wherein each model portion operates in one of the at least two different analysis frameworks, and wherein at least two of the model portions operating in a same analysis framework are topologically separated by one model portion operating in an analysis framework different from the at least two model portions operating in the same analysis framework; and transforming the one model portion, which represents at least a part of the physical device, operating in the analysis framework different from the at least two model portions operating in the same analysis framework to operate in the same analysis framework as the at least two model portions operating in the same analysis framework, using the first physical processing element, the second physical processing element, the third physical processing element or a fourth physical processing element;

wherein the same analysis framework is not an executable block diagram.

2. The method of claim 1, wherein transforming comprises processing the plurality of model portions according to a dedicated algorithm of the plurality of dedicated algorithms corresponding to the analysis framework of the at least two different analysis frameworks to achieve intermediate processing results for each analysis framework; and converting the intermediate processing results for each analysis framework into a single model portion having a single dedicated algorithm corresponding to a single analysis framework within the graphical model.

3. The method of claim 1, wherein the graphical model has a plurality of single model portions resulting from conversion of intermediate processing results, such that the graphical model is not limited to a single analysis framework.

4. The method of claim 1, wherein the graphical model has at least one model portion resulting from conversion of intermediate processing results, such that the graphical model is limited to only a single analysis framework.

5. The method of claim 1, wherein
each model component forming the graphical model has a type,
the types of model components include a mechanical body type, a control signal type, and a rotating machine type, and
the identifying a plurality of model parts comprises recognizing the types of the model components forming the graphical model, and at least one of the identified model parts includes a set of interconnected model components all of which have the same type.

6. The method of claim 1, wherein identifying the analysis framework comprises associating an analysis framework with the dedicated algorithm that corresponds to each of the plurality of model parts.

7. The method of claim 1, wherein each of the different dedicated algorithms derives sorted equations in block diagram form.

8. The method of claim 7, wherein the sorted equations are at least partially formed of block diagram elements.

9. The method of claim 1, wherein grouping each of the plurality of model parts together to form a plurality of model portions comprises operating a selection mechanism to select and indicate which of the plurality of model parts is processed by the same dedicated algorithm, such that each of the resulting plurality of model portions is processed with a different dedicated algorithm.

10. The method of claim 1, wherein one or more of the model parts of the graphical model is are formed of at least one block.

11. The method of claim 10, wherein the at least one block is a polymorph block that is configurable to implement one of a plurality of different execution interpretations.

12. The method of claim 11, wherein the execution interpretation implemented by the polymorph block within the graphical model is based at least in part on an indication from a user received by the graphical modeling environment.

13. In a computational device having one or more physical processors coupled to a memory, a system for processing an executable graphical model formed of a plurality of model components and at least one demarcating block, each model component of the plurality of model components operating within one of at least two different analysis frameworks, wherein each analysis framework relies upon a different dedicated algorithm from other of the analysis frameworks to derive solutions during processing, the graphical model representing, at least in part, a physical device, the system comprising:

a part identification mechanism stored on the memory and executable by a first physical processor, the part identification mechanism configured to identify a plurality of model parts of the graphical model, each of the plurality of model parts being formed of at least one of the plurality of model components, the part identification mechanism configured to automatically identify at least one of the model parts by recognizing the at least one demarcating block within the graphical model, the at least one demarcating block connecting the at least one model part being identified and indicating a boundary of the at least one model part;

an analysis framework identification mechanism stored on the memory and executable by the first or a second physical processor, the analysis framework identification mechanism configured to identify the analysis framework corresponding with each of the plurality of model parts;

a grouping mechanism stored on the memory and executable by the first, second or a third physical processor, the grouping mechanism configured to automatically group each of the plurality of model parts together to form a plurality of model portions, wherein each model portion operates in one of the at least two different analysis frameworks, and wherein at least two of the model portions operating in a same analysis framework are topologically separated by one model portion operating in an analysis framework different from the at least two model portions operating in the same analysis framework; and a transforming mechanism stored on the memory and executable by the first, second, third or a fourth processor, the transforming mechanism configured to modify the one model portion, which represents at least a part of the physical device, operating in the analysis framework different from the at least two model portions operating in the same analysis framework to operate in the same analysis framework as the at least two model portions operating in the same analysis framework;

wherein the same analysis framework is not an executable block diagram.

14. The system of claim 13, wherein the transforming mechanism processes the plurality of model portions according to a dedicated algorithm of the plurality of dedicated algorithms corresponding to the analysis framework of the at least two different analysis frameworks to achieve intermediate processing results for each analysis framework, and converts the intermediate processing results for each analysis framework into a single model portion having a single dedicated algorithm corresponding to a single analysis framework within the graphical model.

15. The system of claim 13, wherein the graphical model has a plurality of single model portions resulting from conversion of intermediate processing results, such that the graphical model is not limited to a single analysis framework.

16. The system of claim 13, wherein the graphical model has at least one model portion resulting from conversion of intermediate processing results, such that the graphical model is limited to only a single analysis framework.

17. The system of claim 13, wherein
each model component forming the graphical model has a type, the types of model components including a mechanical body type, a control signal type, and a rotating machine type, and
the part identification mechanism is further configured to identify the plurality of model parts by recognizing the types of the model components forming the graphical model.

18. The system of claim 13, wherein each of the different dedicated algorithms derives sorted equations in block diagram form.

19. The system of claim 13, wherein the analysis framework identifier mechanism identifies the analysis framework corresponding with each of the plurality of model parts by associating an analysis framework with the dedicated algorithm that corresponds to each of the plurality of model parts.

20. The system of claim 13, wherein the grouping mechanism groups each of the plurality of model parts together to form a plurality of model portions by operating a selection mechanism to select and indicate which of the plurality of model parts is processed by the same dedicated algorithm, such that each of the resulting plurality of model portions is processed with a different dedicated algorithm.

21. The system of claim 13, wherein one or more of the model parts of the graphical model is formed of at least one block.

22. The system of claim 21, wherein the at least one block is a polymorph block that is configurable to implement one of a plurality of different execution interpretations.

23. The system of claim 22, wherein the execution interpretation implemented by the polymorph block within the graphical model is based at least in part on an indication received from a user.

24. A system for processing an executable graphical model having at least two different analysis frameworks operating therein, the system comprising:
at least one processor; and
a physical memory coupled to the at least one processor, the physical memory storing computer readable code that, when executed by the at least one processor, causes the processor to:
provide the graphical model formed of a plurality of model components and at least one demarcating block, each model component of the plurality of model components operating within one of the at least two different analysis frameworks, wherein each analysis framework relies upon a different dedicated algorithm from other of the analysis frameworks to derive solutions during processing;
automatically identify a plurality of model parts of the graphical model, each of the plurality of model parts being formed of at least one of the plurality of model components, at least one of the model parts identified by recognizing the at least one demarcating block within the graphical model, the at least one demarcating block connecting the at least one model part to a second model part and indicating a boundary of the at least one model part;
identify the analysis framework corresponding with each of the plurality of model parts;
automatically group each of the plurality of model parts together to form a plurality of model portions, wherein each model portion operates in one of the at least two different analysis frameworks, and wherein at least two of the model portions operating in a same analysis framework are topologically separated by one model portion operating in an analysis framework different from the at least two model portions operating in the same analysis framework; and
transform the one model portion operating in the analysis framework different from the at least two model portions operating in the same analysis framework to operate in the same analysis framework as the at least two model portions operating in the same analysis framework;
wherein the same analysis framework is not an executable block diagram.

25. The system of claim 24, wherein execution of the computer readable code that causes the at least one processor to transform further causes the at least one processor to
process the plurality of model portions according to a dedicated algorithm of the plurality of dedicated algorithms corresponding to the analysis framework of the at least two different analysis frameworks to achieve intermediate processing results for each analysis framework; and
convert the intermediate processing results for each analysis framework into a single model portion having a single dedicated algorithm corresponding to a single analysis framework within the graphical model.

26. The system of claim 24, wherein the graphical model has a plurality of single model portions resulting from conversion of intermediate processing results, such that the graphical model is not limited to a single analysis framework.

27. The system of claim 24, wherein the graphical model has at least one model portion resulting from conversion of intermediate processing results, such that the graphical model is limited to only a single analysis framework.

28. The system of claim 24, wherein
each model component forming the graphical model has a type, the types of model components including a mechanical body type, a control signal type, and a rotating machine type, and
execution of the computer readable code that causes the at least one processor to identify a plurality of model parts further causes the at least one processor to recognize the types of the model components forming the graphical model.

29. The system of claim 24, wherein execution of the computer readable code that causes the at least one processor to identify the analysis framework further causes the at least one processor to associate an analysis framework with the dedicated algorithm that corresponds to each of the plurality of model parts.

30. The system of claim 24, wherein each of the different dedicated algorithms derives sorted equations in block diagram form.

31. The system of claim 30, wherein the sorted equations are at least partially formed of block diagram elements.

32. The system of claim 24, wherein execution of the computer readable code that causes the at least one processor to group each of the plurality of model parts together to form a plurality of model portions further causes the at least one processor to operate a selection mechanism to select and indicate which of the plurality of model parts is processed by the same dedicated algorithm, such that each of the resulting plurality of model portions is processed with a different dedicated algorithm.

33. The system of claim 24, wherein one or more the model parts of the graphical model is formed of at least one block.

34. The system of claim 33, wherein the at least one block is a polymorph block that is configurable to implement one of a plurality of different execution interpretations.

35. The system of claim 34, wherein the execution interpretation implemented by the polymorph block within the graphical model is based at least in part on an indication received from a user.

36. A system for processing an executable graphical model having at least two different analysis frameworks operating therein, the graphical model representing, at least in part, a physical device, the system comprising:

means for storing the graphical model formed of a plurality of model components and at least one demarcating block in the memory, each model component of the plurality of model components operating within one of the at least two different analysis frameworks, wherein each analysis framework relies upon a different dedicated algorithm from other of the analysis frameworks to derive solutions during processing;

means for automatically identifying a plurality of model parts of the graphical model, using a first physical processing element, each of the plurality of model parts being formed of at least one of the plurality of model components, at least one of the model parts identified by recognizing the at least one demarcating block within the graphical model, the at least one demarcating block connecting the at least one model part being identified to a second model part and indicating a boundary of the at least one model part;

means for identifying the analysis framework corresponding with each of the plurality of model parts, using the first physical processing element or a second physical processing element;

means for automatically grouping each of the plurality of model parts together to form a plurality of model portions, using the first physical processing element, the second physical processing element or a third physical processing element, wherein each model portion operates in one of the at least two different analysis frameworks, and wherein at least two of the model portions operating in a same analysis framework are topologically separated by one model portion operating in an analysis framework different from the at least two model portions operating in the same analysis framework; and means for transforming the one model portion, which represents at least a part of the physical device, operating in the analysis framework different from the at least two model portions operating in the same analysis framework to operate in the same analysis framework as the at least two model portions operating in the same analysis framework, using the first physical processing element, the second physical processing element, the third physical processing element or a fourth physical processing element;

wherein the same analysis framework is not an executable block diagram.

37. In a graphical modeling environment on a computational device having at least one physical processing element coupled to a memory, a method of processing a graphical model having at least two different analysis frameworks operating therein, the method comprising:

storing the graphical model formed of a plurality of model components and at least one demarcating block in the memory, each model component of the plurality of model components operating within one of the at least two different analysis frameworks, wherein each analysis framework relies upon a different dedicated algorithm from other of the analysis frameworks to derive solutions during processing;

automatically identifying a plurality of model parts of the graphical model, using a first physical processing element, each of the plurality of model parts being formed of at least one of the plurality of model components, at least one of the model parts identified by recognizing the at least one demarcating block within the graphical model, the at least one demarcating block connecting the at least one model part being identified to a second model part and indicating a boundary of the at least one model part;

identifying the analysis framework corresponding with each of the plurality of model parts, using the first physical processing element or a second physical processing element;

automatically grouping each of the plurality of model parts together to form a plurality of model portions, using the first physical processing element, the second physical processing element or a third physical processing element, wherein each model portion operates in one of the at least two different analysis frameworks, and wherein at least two of the model portions operating in a same analysis framework are topologically separated by one model portion operating in an analysis framework different from the at least two model portions operating in the same analysis framework; and transforming the one model portion, which represents at least a part of the physical device, operating in the analysis framework different from the at least two model portions operating in the same analysis framework to operate in the same analysis framework as the at least two model portions operating in the same analysis framework, using the first physical processing element, the second physical processing element, the third physical processing element or a fourth physical processing element;

wherein
the same analysis framework is not an executable block diagram,
each model component forming the graphical model has a type,
the types of model components include a mechanical body type, a control signal type, and a rotating machine type, and
the identifying a plurality of model parts of the graphical model comprises recognizing directly connected model components having the same type.

* * * * *

UNITED STATES PATENT AND TRADEMARK OFFICE
CERTIFICATE OF CORRECTION

| | | |
|---|---|---|
| PATENT NO. | : 7,979,243 B1 | Page 1 of 1 |
| APPLICATION NO. | : 11/129000 | |
| DATED | : July 12, 2011 | |
| INVENTOR(S) | : Pieter J. Mosterman et al. | |

It is certified that error appears in the above-identified patent and that said Letters Patent is hereby corrected as shown below:

Col. 15, line 63 should read: "model parts of the graphical model is ~~are~~ formed of at least"

Signed and Sealed this
Nineteenth Day of June, 2012

David J. Kappos
*Director of the United States Patent and Trademark Office*